US008316322B2

(12) United States Patent
Kim

(10) Patent No.: US 8,316,322 B2
(45) Date of Patent: Nov. 20, 2012

(54) METHOD FOR EDITING PLAYLIST AND MULTIMEDIA REPRODUCING APPARATUS EMPLOYING THE SAME

(75) Inventor: Kyung-min Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 649 days.

(21) Appl. No.: 12/038,070

(22) Filed: Feb. 27, 2008

(65) Prior Publication Data

US 2009/0077482 A1    Mar. 19, 2009

(30) Foreign Application Priority Data

Sep. 17, 2007  (KR) .................. 10-2007-0094425

(51) Int. Cl.
*G06F 3/00* (2006.01)

(52) U.S. Cl. ................... 715/821; 715/822; 715/769

(58) Field of Classification Search .......... 715/821–822, 715/769
See application file for complete search history.

(56) References Cited

U.S. PATENT DOCUMENTS

| 7,227,073 | B2 | 6/2007 | Kim | |
|---|---|---|---|---|
| 7,680,824 | B2 * | 3/2010 | Plastina et al. | 707/737 |
| 7,685,210 | B2 * | 3/2010 | Plastina et al. | 707/805 |
| 7,756,388 | B2 * | 7/2010 | Plastina et al. | 386/46 |
| 7,831,605 | B2 * | 11/2010 | Plastina et al. | 707/758 |
| 7,925,996 | B2 * | 4/2011 | Hofmeister et al. | 715/863 |
| 2002/0197058 | A1 * | 12/2002 | Suzuki et al. | 386/69 |
| 2004/0123725 | A1 | 7/2004 | Kim | |
| 2005/0149872 | A1 * | 7/2005 | Fong et al. | 715/727 |
| 2006/0112335 | A1 * | 5/2006 | Hofmeister et al. | 715/701 |
| 2006/0253874 | A1 * | 11/2006 | Stark et al. | 725/62 |
| 2007/0220580 | A1 * | 9/2007 | Putterman et al. | 725/134 |
| 2007/0282787 | A1 * | 12/2007 | Shirai et al. | 707/1 |
| 2008/0052637 | A1 * | 2/2008 | Ben-Yoseph et al. | 715/800 |
| 2008/0059894 | A1 * | 3/2008 | Cisler et al. | 715/762 |
| 2008/0184127 | A1 * | 7/2008 | Rafey et al. | 715/736 |
| 2008/0184142 | A1 * | 7/2008 | Ijichi et al. | 715/764 |
| 2009/0069915 | A1 * | 3/2009 | Khedouri et al. | 700/94 |
| 2009/0248702 | A1 * | 10/2009 | Schwartz et al. | 707/10 |

FOREIGN PATENT DOCUMENTS

| CN | 1301506 C | 2/2007 |
|---|---|---|
| DE | 200 18 559 U1 | 1/2001 |
| EP | 1 650 627 A2 | 4/2006 |
| JP | 10-162557 | 6/1998 |

(Continued)

OTHER PUBLICATIONS

Search Report and Written Opinion of International Application No. PCT/KR2008/002959 dated Nov. 7, 2008.

(Continued)

*Primary Examiner* — Michael Roswell
*Assistant Examiner* — William Titcomb
(74) *Attorney, Agent, or Firm* — Jefferson IP Law, LLP

(57) ABSTRACT

A method for editing a playlist and a multimedia reproducing apparatus employing the same. The method for editing a playlist includes displaying a list including a plurality of content stored on a content reproducing apparatus, determining a content registration state indicating whether specific content on the list is registered in a playlist if a specific command is input during the displaying of the list, and displaying a menu including the content registration state. Accordingly, since a plurality of playlists is supported, the user can edit the playlist more diversely and more conveniently.

19 Claims, 13 Drawing Sheets

FOREIGN PATENT DOCUMENTS

| | | |
|---|---|---|
| JP | 2000-251486 | 9/2000 |
| KR | 2003-8730 | 1/2003 |
| KR | 2007-70919 | 7/2007 |
| WO | 02/37499 A1 | 5/2002 |
| WO | WO 03/015099 | 2/2003 |

OTHER PUBLICATIONS

US 6,441,832 dated Aug. 27, 2002 (English Abstract).

* cited by examiner

METHOD FOR EDITING PLAYLIST AND MULTIMEDIA REPRODUCING APPARATUS EMPLOYING THE SAME

CROSS-REFERENCE TO RELATED APPLICATIONS

This application claims all benefits accruing under 35 U.S.C. §119 from Korean Patent Application No. 2007-94425, filed in the Korean Intellectual Property Office on Sep. 17, 2007, the disclosure of which is incorporated herein by reference.

BACKGROUND OF THE INVENTION

1. Field of the Invention

Aspects of the present invention relate to a multimedia reproducing apparatus and a control method thereof, and, more particularly, to a method for editing a playlist of a multimedia reproducing apparatus and a multimedia reproducing apparatus employing the same.

2. Description of the Related Art

An MP3 player stores content, such as music and dialog, in an embedded memory without using an extra tape or compact disk (CD), and allows a user to select and enjoy the content whenever the user wishes. The MP3 player provides a high quality sound equivalent to that of the CD in reproducing the stored information.

MP3 players generally display a current operation state on a display panel so that the user can easily determine the current operation state, and also displays diverse information about currently reproduced MP3 audio on the display panel so that the user can easily determine the currently reproduced audio.

In recent years, in order to provide various amusements to users, MP3 players have been developed into content reproducing apparatuses that are capable of reproducing a variety of multimedia content, including an image and a radio broadcast signal, in addition to audio. Since the multimedia reproducing apparatus provides various types of content as described above, the user may create a separate playlist to collect frequently used content therein.

However, if a single playlist is provided, the user cannot organize frequently used content by genre. If the playlist is full, previously registered content must be deleted. In order to register new content in the playlist, the user is required to convert a mode of the multimedia reproducing apparatus into an editing mode, which causes an inconvenience to the user.

SUMMARY OF THE INVENTION

Aspects of the present invention provide a multimedia reproducing apparatus which supports a plurality of playlists to diversify a playlist editing method in storing or deleting various contents to or from the playlists, and provides a UI to facilitate editing of a playlist, and a method for editing a playlist thereof.

Additional aspects and/or advantages of the invention will be set forth in part in the description which follows and, in part, will be obvious from the description, or may be learned by practice of the invention.

According to an aspect of the present invention, a method for editing a playlist is provided. The method includes displaying a list including a plurality of contents stored on a content reproducing apparatus, determining a content registration state indicating whether specific content on the list is registered in a playlist, if a specific command is input during the displaying of the list; and displaying a menu including the content registration state.

According to another aspect of the present invention, if the specific content is not registered in the playlist, the displaying of the menu comprises displaying a menu including an item to add the specific content to the playlist ('Add to Playlist' item); and if the specific content is registered in the playlist, the displaying of the menu comprises displaying a menu including an item to delete the specific content from the playlist ('Delete from Playlist' item).

According to another aspect of the present invention, if a plurality of playlists are stored on the content reproducing apparatus and if the specific content is registered in one of the plurality of playlists and is not registered in another playlist, the displaying of the menu comprises displaying a menu including both the 'Add to Playlist' item and the 'Delete from Playlist' item.

According to another aspect of the present invention, if a command to select the 'Add to Playlist' item is input, the displaying of the menu further comprises listing playlists where the specific content is not registered; and displaying the list of playlists.

According to another aspect of the present invention, the method further comprises registering the specific content in the selected playlist if a command to select at least one of the listed playlists is input.

According to another aspect of the present invention, if a command to select the 'Delete from Playlist' item is input, the displaying of the menu further comprises listing playlists where the specific content is registered; and displaying the list.

According to another aspect of the present invention, the method further comprises deleting the specific content from the selected playlist if a command to select at least one of the listed playlists is input.

According to another aspect of the present invention, the specific content is content that is being reproduced at the time of inputting the specific command.

According to another aspect of the present invention, the specific content is content highlighted at the time of inputting the specific command.

According to another aspect of the present invention, if the specific content is an item within a playlist, the displaying of the menu comprises displaying a menu including an item to delete all of the contents.

According to another aspect of the present invention, a multimedia reproducing apparatus is provided. The apparatus includes a display to display a list including a plurality of contents, a storage unit to store a plurality of playlists, and a controller to determine a content registration state indicating whether a specific content of the list is registered in the playlist, if a specific command is input during the displaying of the list, and to display a menu including the content registration state on the display.

According to another aspect of the present invention, if the specific content is not registered in one of the playlists, the controller displays on the display a menu including an item to add the specific content to the playlists where the content is not registered ('Add to Playlist' item), and if the specific content is registered in one of the playlists, the controller displays on the display a menu including an item to delete the specific content from the playlists where the content is registered ('Delete from Playlist' item).

According to another aspect of the present invention, if the specific content is registered in a one of the plurality of playlists and is not registered in others of the playlists, the controller displays on the display a menu including both the 'Add to Playlist' item and the 'Delete from Playlist' item.

According to another aspect of the present invention, if a command to select the 'Add to Playlist' item is input, the controller lists the playlists where the specific content is not registered and displays the list of playlists on the display.

According to another aspect of the present invention, if a command to select at least one of the listed playlists is input, the controller registers the specific content in the selected playlist.

According to another aspect of the present invention, if a command to select the 'Delete from Playlist' item is input, the controller lists the playlists where the specific content is registered and displays the list of playlists on the display.

According to another aspect of the present invention, if a command to select at least one of the listed playlists is input, the controller deletes the specific content from the selected playlist.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

Figure 1:
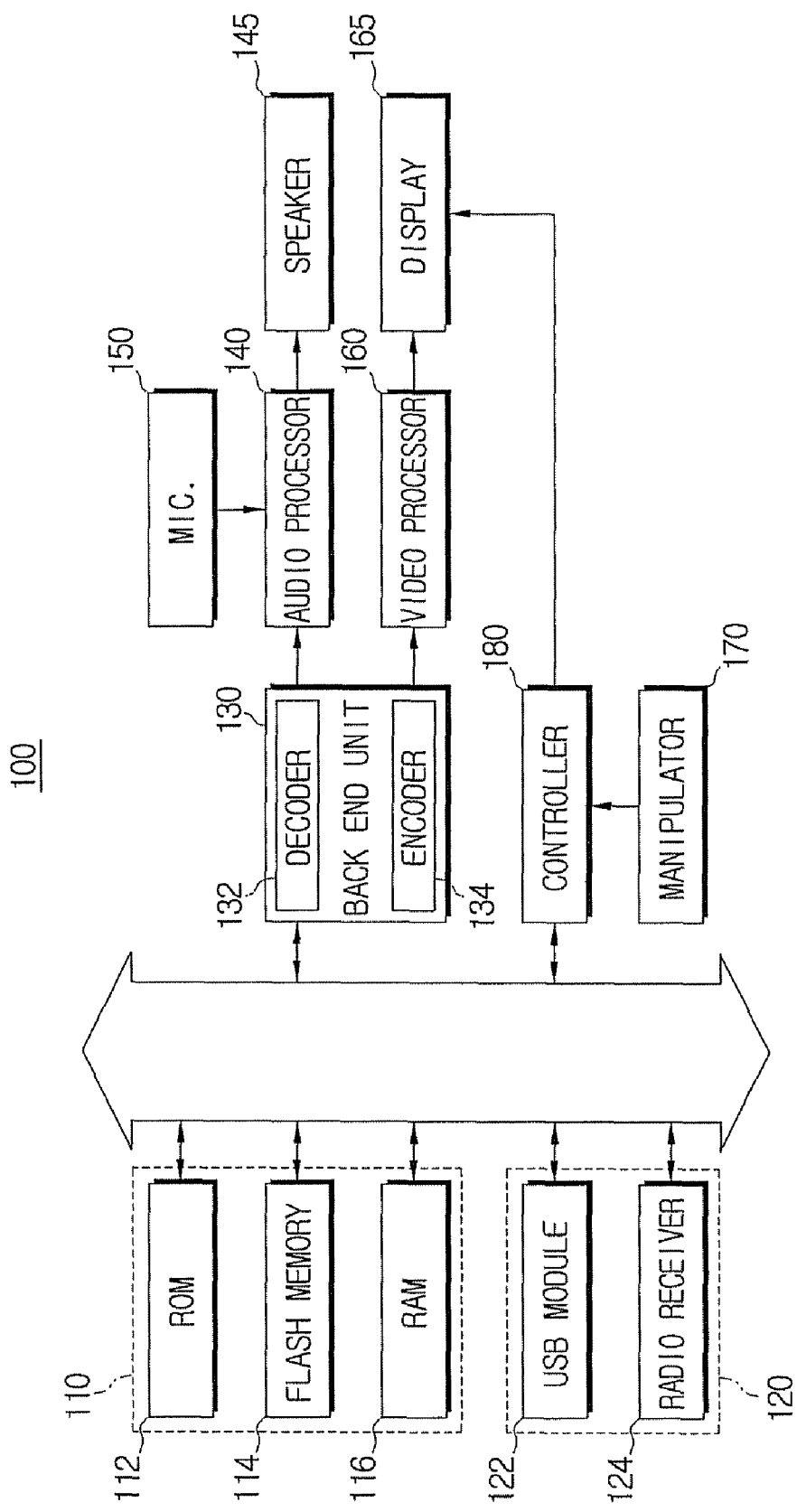
FIG. 1 is a block diagram illustrating an MP3 player which is one of digital multimedia reproducing apparatuses to which aspects of the present invention are applicable.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 shows an MP3 player, which is an example of a content reproducing apparatus to which aspects of the present invention are applicable. As shown in FIG. 1, an MP3 player 100 according to an example embodiment of the present invention comprises a storage unit 110, a communication interface 120, a back end unit 130, an audio processor 140, a speaker 145, a microphone 150, a video processor 160, a display 165, a manipulator 170, and a controller 180. The MP3 player 100 according to other aspects of the present invention need not have all of the above components. According to still other aspects of the present invention, the MP3 player 100 may have additional and/or different units. Similarly, the functionality of two or more of the above units may be integrated into a single component.

The storage unit 110 stores information about programs that are needed to control the MP3 player 100, content, content information, and icon information, and includes a read only memory (ROM) 112, a flash memory 114, and a random access memory (RAM) 116.

The ROM 122 stores information that must be maintained even in a power-off state, such as the content stored in the MP3 player 100, content information, menu information, icon information, and program information relating to an icon. The menu information includes information about a plurality of playlists.

If five (5) playlists are provided in the MP3 player 100, the ROM 112 may divide the storage area of the ROM 112 into an area for storing playlist information and an area for storing icon information and content. The area for storing the playlist information may also be divided into a first playlist storage area through a fifth playlist storage area. The playlist storage areas may also store information on content registered in the respective playlist storage areas.

The flash memory 114 stores a program for controlling the back end unit 130 and various data for retention purposes, which can be updated. The RAM 116 is a storage space in which various backup data is temporarily stored, and serves as a working memory for the controller 180. The data stored in the ROM 112 and the flash memory 114 still remain even in a power-off state, whereas the data stored in the RAM 116 are deleted in a power-off state.

The communication interface 120 performs data communications between an external device and the MP3 player, and may include a USB module 122 and a radio receiver 124. The USB module 122 transmits and receives data input and output to and from a USB device, such as a PC and a USB memory. The radio receiver 124 receives an audio broadcast signal and transmits the signal to the back end unit 130. According to aspects of the present invention, content may include a still image file, a moving picture file, an audio file, and a broadcast signal.

The back end unit 130 is responsible for a signal-processing with respect to video and/or audio, such as compression, decompression, and reproduction. The back end unit 130 comprises a decoder 132 and an encoder 134. The decoder 132 decompresses a file output from the storage unit 110 or data output from the communication interface 120, applies an audio component of the file to the audio processor 140 and applies a video component of the file to the video processor 160. The encoder 134 compresses a video component and an audio component input from the communication interface 120 in a predetermined format, and transmits the compressed file to the storage unit 110. The encoder 134 may compress an audio file input from the audio processor 140 in a predetermined format and transmit the compressed audio file to the storage unit 110.

The audio processor 140 converts an analog audio signal input through an audio input element (such as the microphone 150) into a digital audio signal, and transmits the converted signal to the back end unit 130. The audio processor 140 may convert a digital audio signal output from the back end unit 130 into an analog audio signal and output the converted signal through the speaker 145.

The video processor 160 is an element that performs signal-processing with respect to a video input from the back end unit 130 and outputs the video to the display 165. The display 165 is a display element that displays an image, text, and an icon output from the video processor 160 or the controller 180.

The manipulator 170 receives a user's command and transmits the command to the controller 180, and may be divided into an integral type and a split type with respect to the MP3 player. The manipulator 170 may be embodied as a user interface (UI) allowing a user to input a user command through a menu display displayed on the display 165. In this embodiment, the MP3 player 100 provides a touch screen panel incorporating functions of the display 165 and the manipulator 170. Accordingly, the user inputs a command to select information simply by viewing the information displayed on the touch screen panel and touching an area where the information is displayed.

The controller 180 controls entire operations of the MP3 player 100. In particular, the controller 180 controls the respective function blocks of the MP3 player 10 according to a user's command input through the manipulator 170. For example, if the user inputs a command to reproduce a file stored in the storage unit 110, the controller 180 reads out the file from the storage unit 110 and applies the file to the back end unit 130. The controller 180 controls the back end unit 130, the audio processor 140, the video processor 160, the speaker 145, and the display 165 such that the back end unit 130 decodes the file, the audio processor 140 and the video processor 160 signal-process the audio and video components respectively, the audio is output through the speaker 145, and the video is output through the display 165.

If a command to display a menu is input by a user while a list containing highlighted content is displayed, the controller 180 determines a content registration state indicating whether the highlighted content is included in the playlist. If the highlighted content is registered in the playlist, the controller 180 generates a menu including an item to delete the content from the playlist ('Delete from Playlist' item, shown in FIG. 3B) and displays the menu on the display 165. If the highlighted content is not registered in the playlist, the controller 180 generates a menu including an item to add the content to the playlist ('Add to Playlist' item, shown in FIG. 3B), and displays the menu on the display 165. In this fashion, the controller 180 generates and provides a UI for facilitating editing of a playlist. A detailed description of this will be made below.

Figure 2:
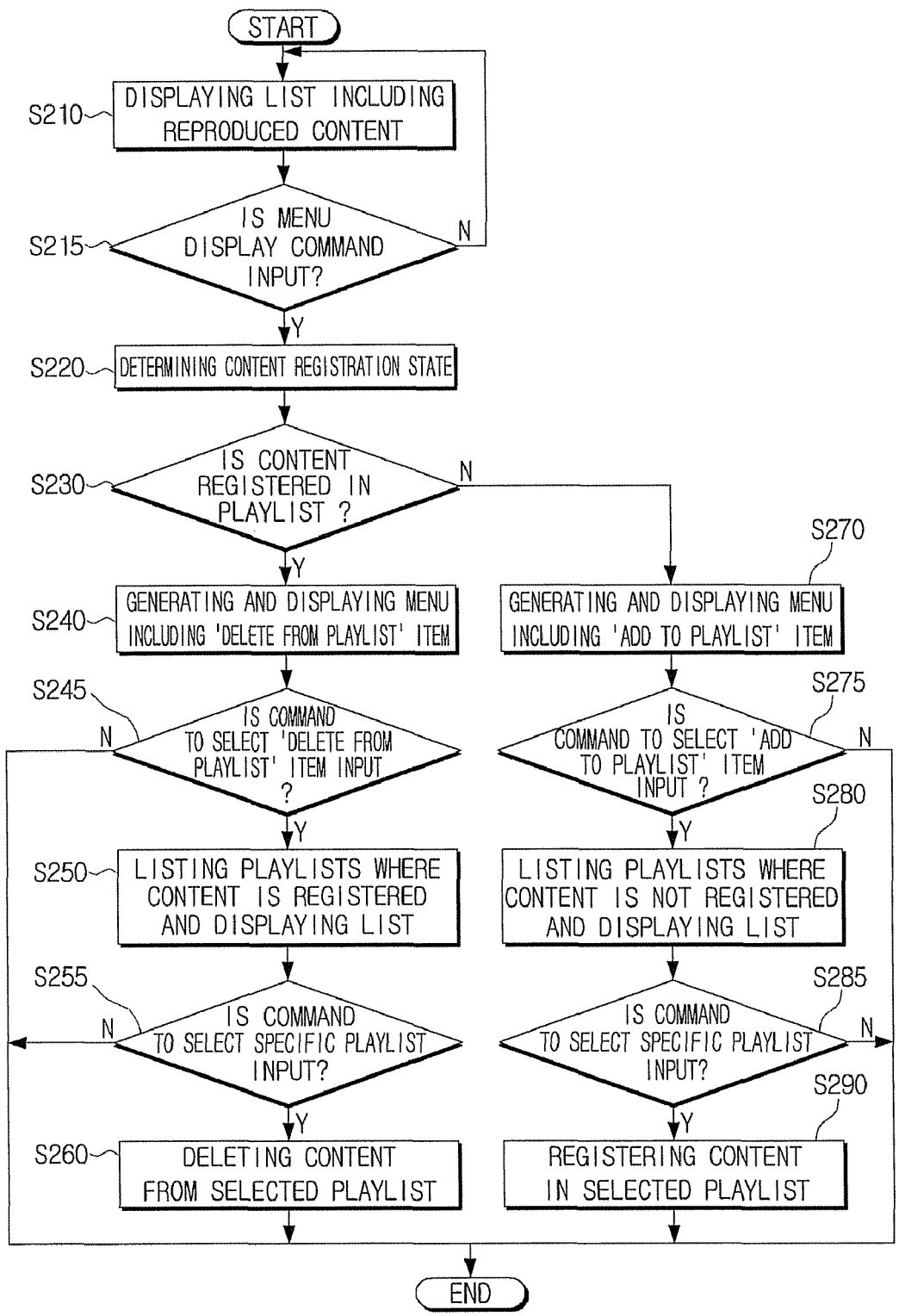
FIG. 2 is a flowchart illustrating a process for editing a playlist according to an example embodiment of the present invention.

FIG. 2 is a flowchart of a process of editing a playlist according to an example embodiment of the present invention. When the MP3 player 100 reproduces specific content, a list including the content is displayed on the display 165 at block S210. In displaying the list, the controller 180 highlights the reproduced content to distinguish the highlighted content from other content.

The controller 180 determines whether a command to display a menu is input at block S215. If the MP3 player 100 has a touch screen panel, the user touches the touch screen panel. Display information labeled with 'Menu' is displayed on an area of the touch screen panel, and the user inputs the command to display the menu by touching the 'Menu' display information. If such an operation is performed, the controller determines that the command to display the menu is input.

If the command to display the menu is input, the controller 180 determines a content registration state indicating whether the highlighted content, i.e., the currently reproduced content, is registered in a playlist at block S220. Since the ROM 112 has a separate playlist storage area, the controller 180 determines the content registration state based on whether information about the highlighted content is stored in the playlist storage area.

If the information about the highlighted content is stored in the playlist storage area, the controller 180 determines that the highlighted content is registered in the playlist. If not, the controller 180 determines that the highlighted content is not registered in the playlist. In particular, if the playlist storage area is divided into first through fifth playlist storage areas, the controller 180 determines whether content information is stored in each of the playlist storage areas. For the convenience of explanation, it is assumed that information of the reproduced content is stored in the first through the third playlist storage areas but is not stored in the fourth and the fifth playlist storage areas.

If the reproduced content is registered in the playlist, the controller 180 generates a menu including an item to delete the content from the playlist ('Delete from Playlist' item), and displays the menu on the display 165 at block S240. The user edits the playlist in a way of registering or deleting content in or from the playlist. Accordingly, if the content has been already registered in the playlist, a UI to delete the content from the playlist is provided to facilitate the editing of the playlist.

The controller 180 determines whether a command to select the 'Delete from Playlist' item is input at block S245. If the menu including the 'Delete from Playlist' item is displayed on the display 176, the user can input a command to select the 'Delete from Playlist' item by touching an area on which the 'Delete from Playlist' item is displayed.

If the command to select the 'Delete from Playlist' item is input, the controller 180 generates a list of playlists where the content is registered and displays the list on the display 165 at block S250. In the above example, since the content information is stored in the first through the third playlist storage areas, the controller 180 generates a list including the first through the third playlists and displays the list on the display 165.

The controller 180 determines whether a command to select a specific playlist from the list of playlists is input at block S255. The display 165 displays the list of playlists, and the user selects a playlist from which the user wishes to delete the content. In selecting a specific playlist, the user touches an area where the specific playlist is displayed.

The controller 180 deletes the reproduced content from the selected playlist at block S260. For example, if the user inputs a command to select the second playlist from the first through the third playlists, the controller 180 deletes information of the reproduced content from the second playlist storage area.

Figure 3A:
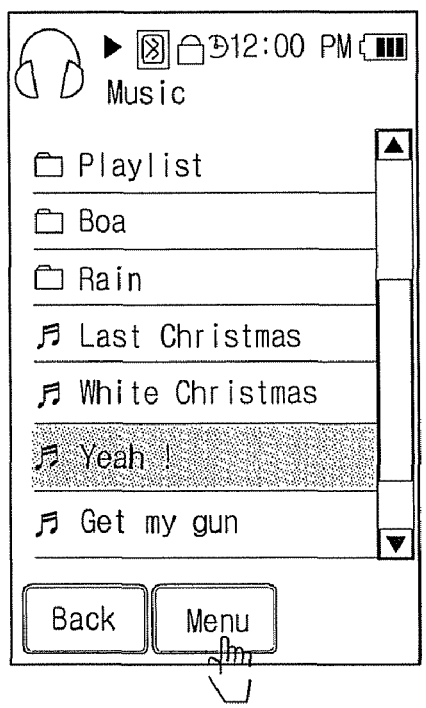
FIGS. 3A to 3H are views illustrating user interfaces (UIs) provided by an MP3 player in the process of adding content to a playlist according to an example embodiment of the present invention.
Figure 3B:
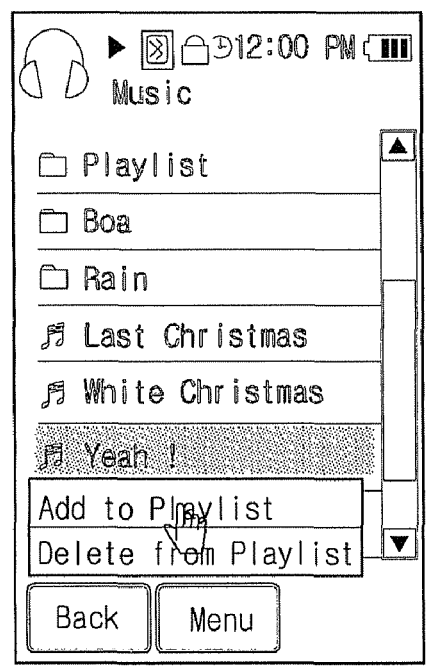

On the other hand, if the reproduced content is not registered in the playlist, the controller 180 generates a menu including an item to add the content to the playlist ('Add to Playlist' item, as shown in FIG. 3B) and displays the menu on the display 165 at block S270. Since information about the reproduced content is not stored in the fourth and fifth playlists, the controller 180 determines that the content is not registered in the fourth and the fifth playlists. Therefore, the controller 180 generates the menu including the 'Add to Playlist' item and displays the menu on the display 165.

The controller 180 determines whether a command to select the 'Add to Playlist' item is input at block S275. If the menu including the 'Add to Playlist' item is displayed, the user inputs a command to select the 'Add to Playlist' item by touching an area where the 'Add to Playlist' item is displayed.

If the command to select the 'Add to Playlist' item is input, the controller 180 generates a list of playlists where the content is not registered and displays the list on the display 165 at block S280. The controller 180 detects whether the content information is stored in each of the playlist storage areas. If, for example, the content information is not stored in the fourth and the fifth playlist storage areas, the controller 180 generates a list including the fourth and the fifth playlists, and displays the list on the display 165.

The controller 180 determines whether a command to select a specific playlist is input at block S285. The user selects a playlist to which the user wishes to add the content among the fourth and the fifth playlists displayed on the display 165. If the user wishes to register the content in the fourth playlist, the user inputs a command to select the fourth playlist by touching an area where the fourth playlist is displayed.

The controller 180 registers the content in the specific playlist at block S290. If the user inputs a command to select the fourth playlist, the controller 180 stores the content information in the fourth playlist storage area. The content is registered in the playlist in the above-described manner.

According to aspects of the present invention, since a plurality of playlists is provided, the 'Delete from Playlist' item and the 'Add to Playlist' item are not necessarily incompatible with each other on the menu. As described above, since the content is registered in the first through the third playlists but is not registered in the fourth and the fifth playlists, the 'Delete from Playlist' item and the 'Add to Playlist' item are concurrently displayed on the menu.

Since a plurality of playlists are stored on the MP3 player 100, the user can generate various playlists by genre or by other criteria. Since the 'Delete from Playlist' item and the 'Add to Playlist' item are distinguished from each other, the user is not required to check where the content is registered playlist by playlist in editing the playlist, and the same content may be prevented from being registered in the same playlist.

Hereinafter, a process of adding or deleting a specific content to or from a playlist using a series of UIs provided by the MP3 player 100 according to an example embodiment of the present invention will now be described with reference to the drawings. FIGS. 3A to 3H show UIs (user interfaces) provided by the MP3 player 100 in the process of adding specific content to a playlist. As shown in FIG. 3A, the user listens to a music file 'Yeah'. If the music file 'Yeah' is reproduced, the controller 180 highlights the 'Yeah' item to distinguish the music file from other items. The user selects the 'Menu' display information while the music file 'Yeah' is reproduced.

If the user selects the 'Menu' display information, the controller 180 determines a file registration state. The file registration state indicates whether a currently reproduced file is registered in a playlist or not. If there are a plurality of playlists and if the file is registered in one of the playlists, the controller 180 also determines a playlist where the file is registered.

For example, the selected file is not registered in the first through the third playlists and is registered in the fourth and the fifth playlists. In this case, if the user selects the 'Menu' display information, the controller 180 determines that the file is not registered in the first through the third playlists and is registered in the fourth and the fifth playlists. The controller 180 displays a menu including both the 'Add to Playlist' item and the 'Delete from Playlist' item, as shown in FIG. 3B, since there is a playlist where the file is registered and a playlist where the file is not registered. The 'Add to Playlist' item may not be displayed if all playlists on the MP3 player 100 have the selected file. Similarly, the 'Delete from Playlist' item may not be displayed if none of the playlists on the MP3 player 100 have the selected file.

Figure 3C:
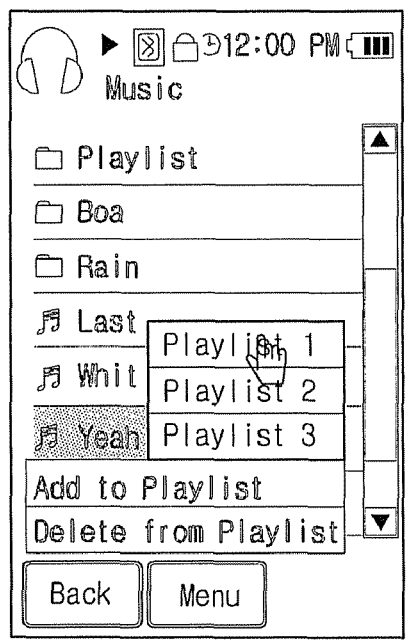
Figure 3D:
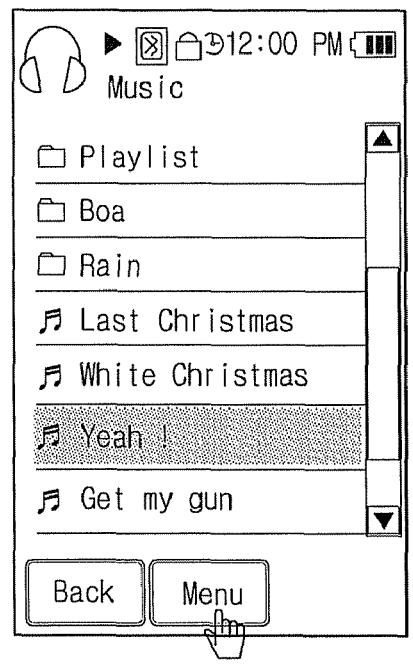

If the user selects the 'Add to Playlist' item, the controller 180 generates a list including the first through the third playlists where the file is not registered, and displays the list in a pop up window form as shown in FIG. 3C. If the user selects the first playlist of FIG. 3C, the controller 180 registers the file 'Yeah' in the first playlist, generates a UI as shown in FIG. 3D, and displays the UI on the display 165.

Figure 3E:
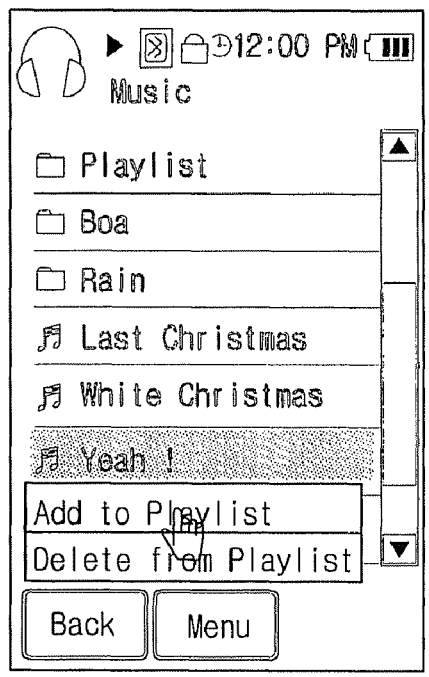
Figure 3F:
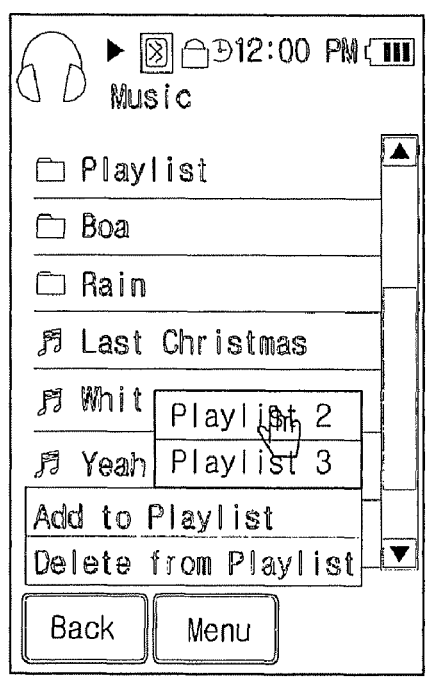

If the user selects the 'Menu' again, the menu including the 'Add to Playlist' item and the 'Delete from Playlist' item is displayed, as shown in FIG. 3E. If the user selects the 'Add to Playlist' item, a list including the second and the third playlists is displayed on the display 165 in a pop-up window, as shown in FIG. 3F. Since the file 'Yeah' has been registered in the first playlist in the step of FIG. 3C, the list displayed in the step of FIG. 3F does not include the first playlist.

Figure 3G:
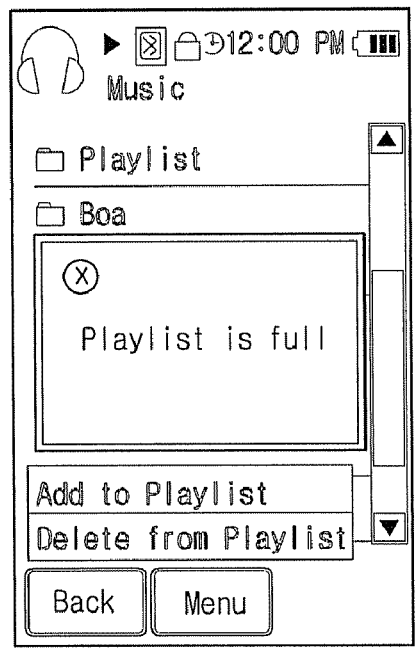
Figure 3H:
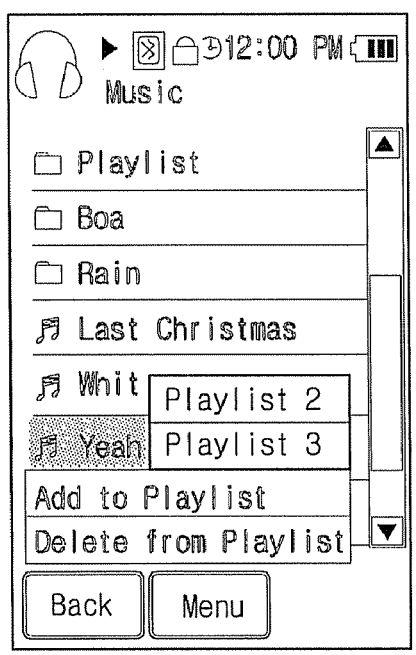

If the user inputs a command to select the second playlist, the controller 180 checks a capacity of the second playlist to determine whether the second playlist is capable of registering the file 'Yeah'. If the second playlist has a capacity to register up to 200 files and if 200 files have been already registered in the second playlist, the controller 180 determines that the second playlist is full. Accordingly, the controller 180 generates display information labeled with 'Playlist is full' and displays the information on the display 165, as shown in FIG. 3G. After a predetermined time (for example, about 3 seconds) elapses, the controller 180 displays the list including the second and the third playlists on the display 165, as shown in FIG. 3H.

Figure 4A:
FIGS. 4A to 4F are views illustrating UIs provided by an MP3 player in the process of deleting content from a playlist according to an example embodiment of the present invention.
Figure 4B:
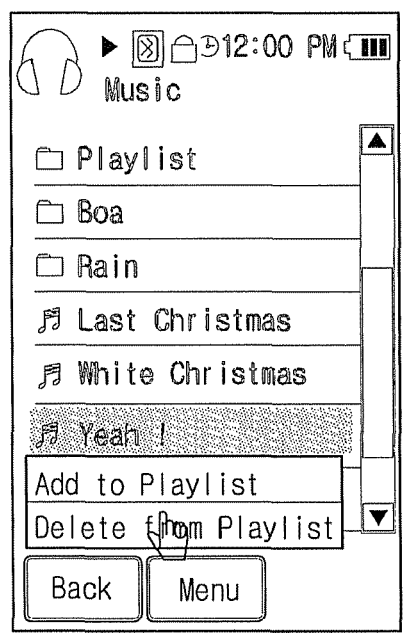

FIGS. 4A to 4E show UIs provided by an MP3 player in the process of deleting specific content from a playlist. As shown in FIG. 4A, the user inputs a command to select the 'Menu' display information while the file 'Yeah' is reproduced. Since the file 'Yeah' is registered in the fourth and the fifth playlists, the controller 180 displays a menu including the 'Add to Playlist' item and the 'Delete from Playlist' item on the display 165, as shown in FIG. 4B.

Figure 4C:
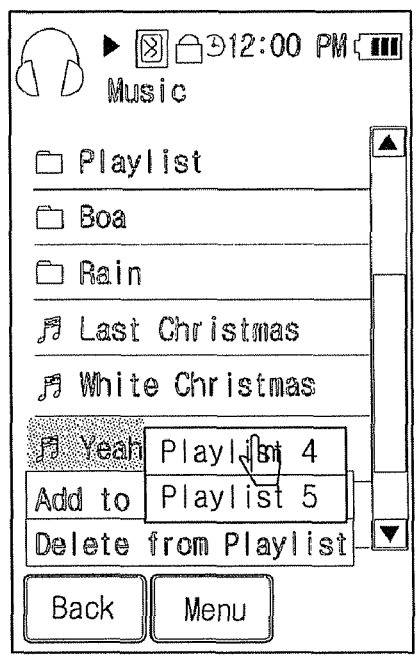
Figure 4D:
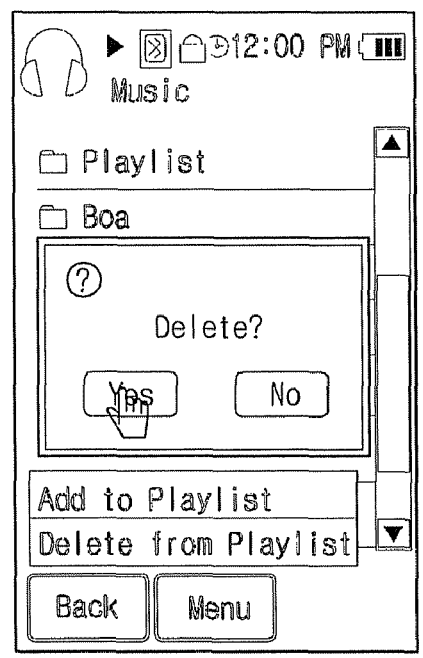

If the user selects the 'Delete from Playlist' item, the controller 180 displays a list including the fourth and the fifth playlists where the file 'Yeah' is registered in a pop up window, as shown in FIG. 4C. If the user inputs a command to select the fourth playlist, the controller 180 generates display information labeled with 'Delete? Yes/No' to question whether the user wishes to delete the file 'Yeah' from the fourth playlist, and displays the display information on the display 165, as shown in FIG. 4D.

Figure 4E:
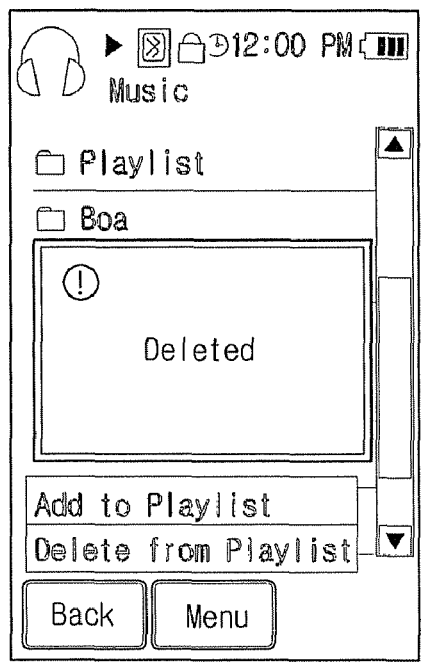
Figure 4F:
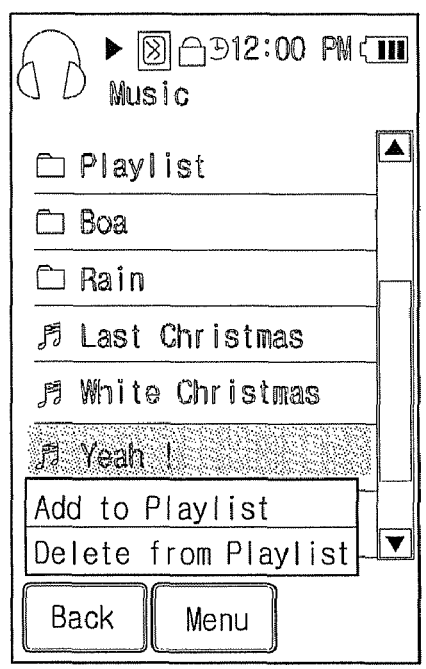

If the user inputs a command to select 'Yes', display information 'Deleted' confirming that the file 'Yeah' has been deleted from the fourth playlist is generated and displayed on the display 165 as shown in FIG. 4E. As a result, the file 'Yeah' is not registered in the first through the fourth playlists and is registered in the fifth playlist.

Figure 5A:
FIGS. 5A to 5G are views illustrating UIs provided by an MP3 player in the process of editing a playlist using a file included in the playlist according to an example embodiment of the present invention.
Figure 5B:
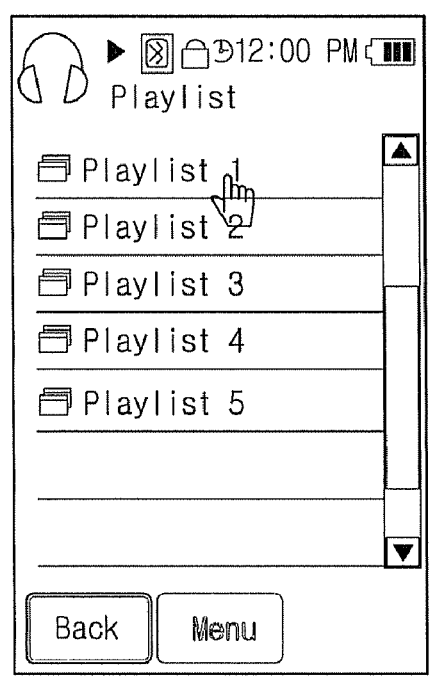

Hereinafter, a process of editing a playlist using a file in the playlist will be described with reference to FIGS. 5A to 5G. FIGS. 5A to 5G show UIs provided in the process of editing a playlist using a file in the playlist. If the user selects a 'Playlist' item, as shown in FIG. 5A, a plurality of playlists are displayed as shown in FIG. 5B. In this example, the MP3 player provides first through fifth playlists.

Figure 5C:
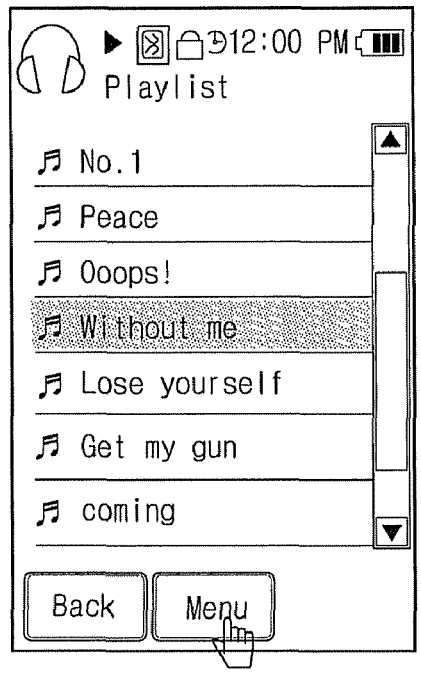

If the user inputs a command to select the first playlist, the controller 180 generates a list of files included in the first playlist and displays the list on the display 165, as shown in FIG. 5C. The user may input a command to reproduce one of files of the list. If the user inputs a command to reproduce the file 'Without me' and the MP3 player reproduces the file, the controller 180 highlights the file 'Without me' to distinguish the file from other files, as shown in FIG. 5C.

If the user inputs a command to select the 'Menu', it is determined whether the file 'Without me' is included in the playlist. If the file 'Without me' is registered in the first through the third playlists but is not registered in the fourth and the fifth playlists, the controller 180 generates a menu including an item to add the file to the playlist ('Add to Playlist' item), an item to delete the file from the playlist ('Delete from Playlist' item), and an item to delete all of the files ('Delete All from Playlist' item), and displays the menu on the display 165.

Figure 5D:
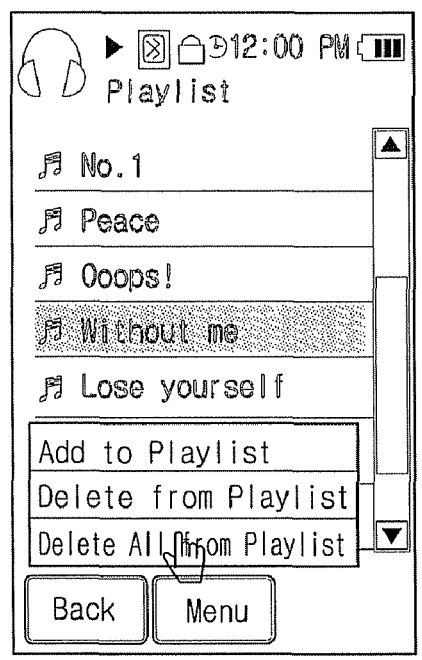

Since the file 'Without me' is not registered in the fourth and the fifth playlists, the user may wish to register the file in the fourth and the fifth playlists. Therefore, the controller 180 generates the 'Add to Playlist' item. Since the file 'Without me' is registered in the first through the third playlists, the user may wish to delete the file from the first through the third playlists. Therefore, the controller 180 generates the 'Delete from Playlist' item. The user may wish to delete all of the files registered in the first playlist. Therefore, the controller 180 generates the 'Delete All from Playlist' item. As a result, the menu shown in FIG. 5D is displayed. If the user selects the 'Add to Playlist' item, a UI as shown in FIG. 3C is displayed on the display 165, and if the user selects the 'Delete from Playlist' item, a UI as shown in FIG. 4C is displayed on the display 165.

Figure 5E:
Figure 5F:
Figure 5G:
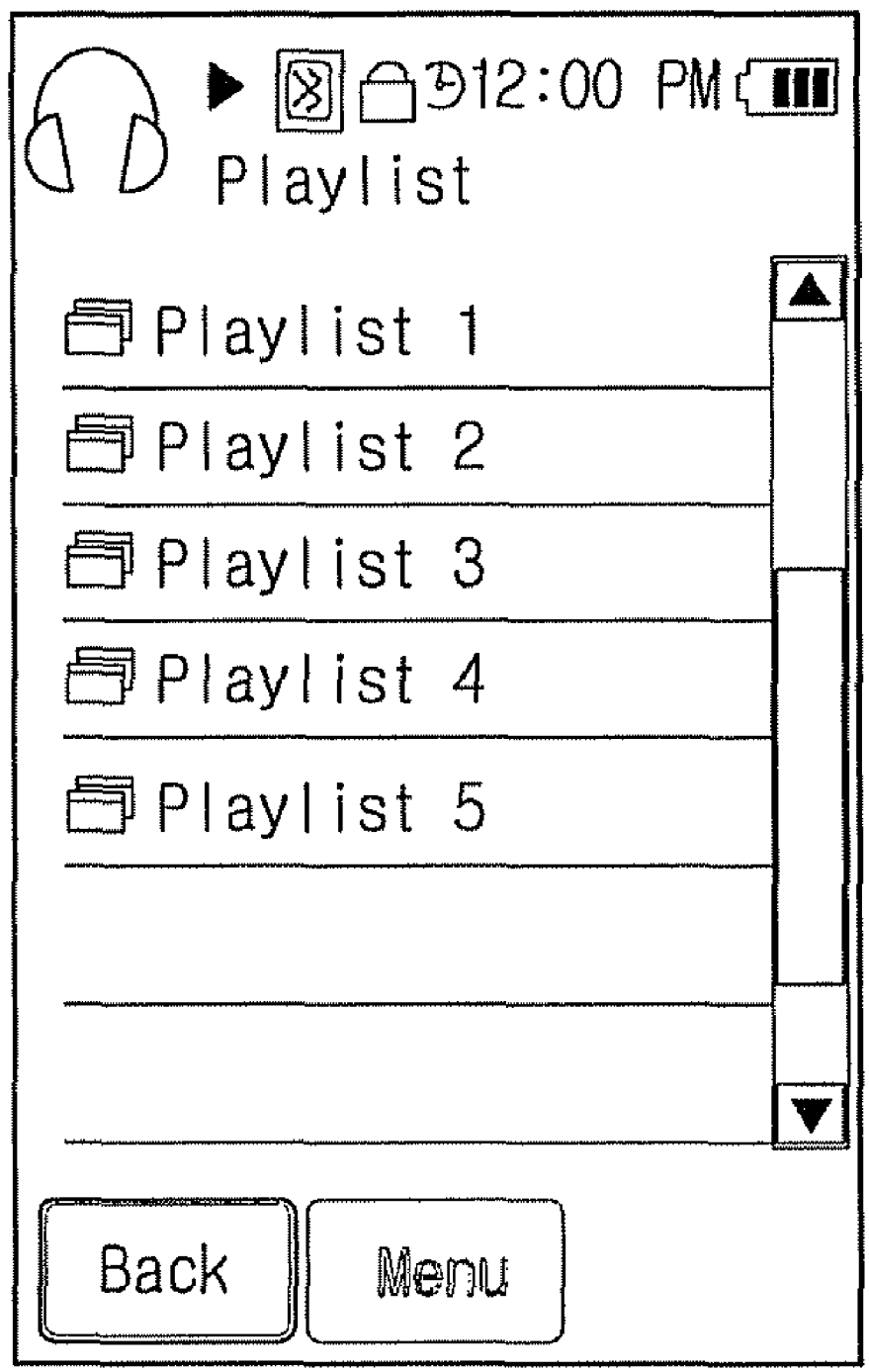

If the user selects the 'Delete All from Playlist' item, the controller 180 generates display information labeled with 'Delete all? Yes/No' to question whether the user wishes to delete all of the files, and displays the information on the display 165, as shown in FIG. 5E. If the user inputs a command to select 'Yes', display information 'Deleted' indicating that all of the files have been deleted is displayed on the display 165, as shown in FIG. 5F. After a predetermined time elapses, the same menu as that of FIG. 5B is displayed on the display 165 as shown in FIG. 5G. However, the first playlist shown in FIG. 5G has no files.

If a plurality of playlists is provided as described above, the UIs described above are displayed on the display 165 to allow the user to edit the playlist more easily.

As described herein, the function of editing the playlist is executed if a command to select a menu is input while a file is reproduced. However, this should not be considered as limiting. A plurality of files can be displayed on the display 186 even if a specific file is not reproduced, and if the user touches a specific one of the files, the touched file is highlighted. A playlist editing mode is operated by selecting the menu.

A process for editing a playlist for a music file has been described herein. However, this should not be considered as limiting. Aspects of the present invention are applicable to any content that can be reproduced.

The MP3 player has been described as a multimedia reproducing apparatus by way of an example. However, this should not be considered as limiting. Accordingly, aspects of the present invention are applicable to any content reproducing apparatus that can reproduce a video and an audio and supports a playlist editing function, such as a mobile phone, a personal digital assistant (PDA), and an audio system.

As described above, according to aspects of the present invention, since the multimedia reproducing apparatus supports a plurality of playlists, the user can edit the contents more diversely. Also, since various UIs are provided on the display according to whether the content is registered in the playlist or not, the user can edit the playlist more conveniently.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, the manipulator 170 has been described as a touchscreen. However, any input device may be employed, such as a scroll-wheel, mouse, keyboard, or the like. Aspects of the present invention may also be recorded on a computer readable medium. The computer readable recording medium is any data storage device that can store data which can be thereafter read by a computer system. Examples of the computer readable recording medium also include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains. Accordingly, it is intended, therefore, that the present invention not be limited to the various example embodiments disclosed, but that the present invention includes all embodiments falling within the scope of the appended claims.

What is claimed is:

1. A method for editing one or more playlists, the method comprising:

displaying a list including a plurality of content;

if a specific command is input with regard to a specific content of the plurality of content, determining whether there are any playlists, and if there exists at least one playlist, determining whether the specific content is included in each of the playlists;

if there exists at least one playlist that does not include the specific content, displaying a menu including an item to add the specific content to at least one playlist in which the specific content is not currently included, and if the item to add the specific content is selected, displaying a list of all playlists that do not include the specific content; and if there exists at least one playlist that includes the specific content, displaying the menu including an item to delete the specific content from at least one playlist in which the specific content is currently included, and if the item to delete the specific content is selected, displaying a list of all playlists that include the specific content.

2. The method according to claim 1, wherein, if the specific content is registered in one of the plurality of playlists and is not registered in another playlist, the displaying of the menu comprises displaying a menu including both the menu item to add the specific content to at least one playlist and the menu item to delete the specific content from at least one playlist.

3. The method according to claim 1, wherein, if a command to select the menu item to add the specific content is input, the displaying of the menu further comprises:

creating a list of all playlists where the specific content is not currently included; and displaying the list of playlists.

4. The method according to claim 3, further comprising adding the specific content to at least one selected playlist if a command to select at least one of the listed playlists is input, and displaying the menu including the item to delete the specific content.

5. The method according to claim 1, wherein, if a command to select the menu item to delete the specific content from at least one playlist is input, the displaying of the menu further comprises:
creating a list of all playlists where the specific content is currently included; and
displaying the list of playlists.

6. The method according to claim 5, further comprising deleting the specific content from at least one selected playlist if a command to select at least one of the listed playlists is input, and displaying the menu including the item to add the specific content.

7. The method according to claim 1, wherein the specific content comprises content that is being reproduced at the time of inputting the specific command.

8. The method according to claim 1, wherein the specific content comprises content highlighted at the time of inputting the specific command.

9. The method according to claim 1, wherein, if the specific content comprises an item included in the playlist, the displaying of the menu further comprises displaying a menu including an item to delete all content corresponding to the playlist.

10. A multimedia reproducing apparatus, comprising:
a display to display a list including a plurality of content;
a storage unit to store a plurality of playlists; and
a controller to determine, if a specific command is input with regard to a specific content, whether there are any playlists, and if there exists at least one playlist, to determine, for the specific content of the plurality of content, whether the specific content is included in each of the playlist, to display a menu including an item to add the specific content to at least one playlist in which the specific content is not currently included if there exists at least one playlist that does not include the specific content, and the menu including an item to delete the specific content from at least one playlist in which the specific content is currently registered if there exists at least one playlist that includes the specific content.

11. The multimedia reproducing apparatus according to claim 10, wherein if the specific content is included in at least one of the plurality of playlists and is not registered in at least one of the playlists, the controller displays on the display a menu including both the menu item to add the specific content to at least one playlist and the menu item to delete the specific content from at least one playlist.

12. The multimedia reproducing apparatus according to claim 10, wherein, if a command to select the menu item to add the specific content is input, the controller creates a list of playlists where the specific content is not currently included and displays the list of playlists on the display.

13. The multimedia reproducing apparatus according to claim 12, wherein, if a command to select at least one of the listed playlists is input, the controller adds the specific content to the at least one selected playlist, and displays the menu including the item to delete the specific content.

14. The multimedia reproducing apparatus according to claim 10, wherein, if a command to select the menu item to delete the specific content is input, the controller creates a list of the playlists where the specific content is currently included and displays the list of playlists on the display.

15. The multimedia reproducing apparatus according to claim 14, wherein, if a command to select at least one of the listed playlists is input, the controller deletes the specific content from the at least one selected playlist, and displays the menu including the item to add the specific content.

16. The multimedia reproducing apparatus according to claim 10, wherein the specific content comprises content that is being reproduced at the time of inputting the specific command.

17. The multimedia reproducing apparatus according to claim 10, wherein the specific content comprises content highlighted at the time of inputting the specific command.

18. A non-transitory computer readable medium comprising instructions that, when executed by a content reproducing apparatus, cause the apparatus to perform the method according to claim 1.

19. A method of manipulating content stored in a content reproducing apparatus, the method comprising:
displaying a list of content stored on the content reproducing apparatus;
determining whether there are any playlists on the apparatus; and
for a specific content of the list, if there exist any playlists, determining a state of whether the content is included in each playlist and displaying the state in a form of a menu including an item to add the specific content to at least one playlist in which the specific content is not currently included and an item to delete the specific content from at least one playlist in which the specific content is currently included when a command is received with regard to the specific content while the list of content is displayed.

* * * * *